M. DOUJAK.
LIFE SAVER AUTOMOBILE ATTACHMENT.
APPLICATION FILED JAN. 2, 1920.
1,346,486.
Patented July 13, 1920.
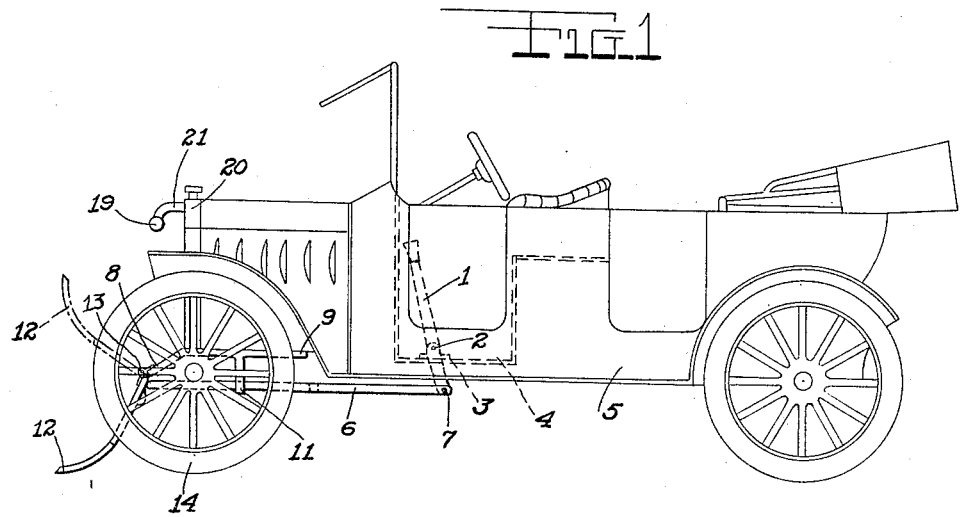
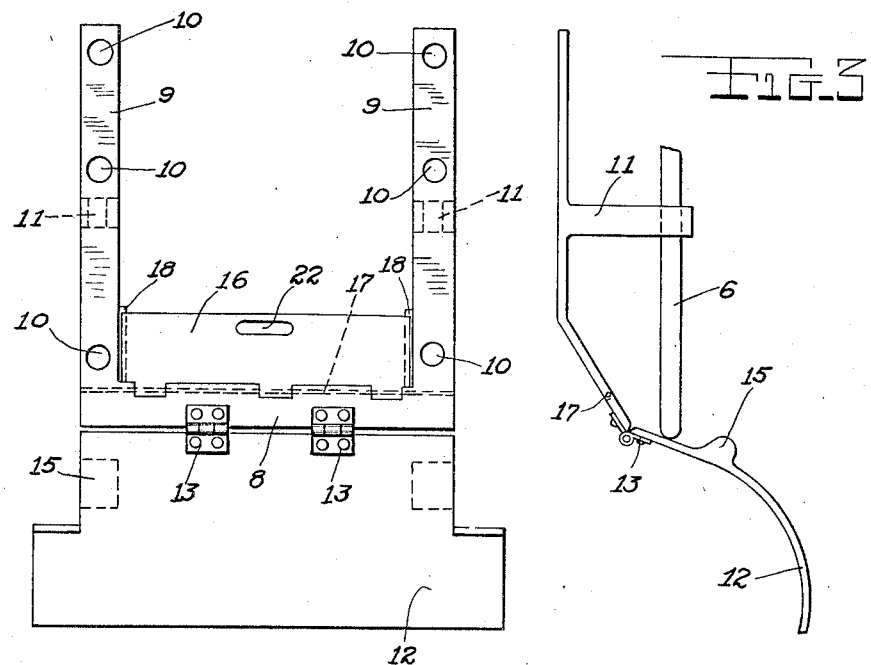
INVENTOR.
Maria Doujak
BY
Harry Jacobson
ATTORNEY.

UNITED STATES PATENT OFFICE.

MARIA DOUJAK, OF NEW YORK, N. Y.

LIFE-SAVER AUTOMOBILE ATTACHMENT.

1,346,486.   Specification of Letters Patent.   Patented July 13, 1920.

Application filed January 2, 1920. Serial No. 348,829.

*To all whom it may concern:*

Be it known that I, MARIA DOUJAK, a citizen of Hungary, and resident of New York, in the county of New York and State of New York, have invented certain new and useful Improvements in Life-Saver Automobile Attachments, of which the following is a specification.

This invention relates to safety attachments for motor vehicles and especially to those adapted for the prevention of injury in case of collision with living beings.

The object of this invention is the provision of means, capable of rapid manipulation when danger is imminent, for preventing objects or beings struck in a head on collision from being run over by the wheels or other parts of the vehicle.

A further object of this invention is the provision of a safety fender, which in its normal position can be used as a bumper.

For the accomplishment of these and other objects, I employ the devices shown in their preferred forms in the accompanying drawings, in which—

Figure 1 is a side elevation of an automobile to which my improved device has been attached.

Fig. 2 is a plan view of my device detached from the vehicle.

Fig. 3 is a side view of the same.

In the practical embodiment of my invention, the operating hand lever 1, pivoted at 2 on bracket 3 which is attached to the floor 4 of a motor vehicle as 5, is pivotally attached to fender operating lever 6 at joint 7. A frame 8, having two horizontal arms 9 spaced apart for attachment to the usual channels on the under side of a motor vehicle, is held on said channels by means of bolts as 10.

Supporting arms 11, which are part of frame 8, project downwardly from arms 9 and are arranged to slidably support lever 6. A fender 12 is attached to frame 8 by hinges 13 at the front of said frame, said fender being suitably shaped to upwardly deflect an object thrown against it, and to clear the wheels 14 of vehicle 5 in any position which said fender may assume. Lugs 15 are provided on said fender for engaging the end of lever 6 on the forward motion of said lever, as hereinafter described.

A crank cover 16 is hinged to that part of frame 8 which is situated between arms 9, on a suitable hinge rod 17, said cover resting in its normal position on strips 18 attached to said arms. A hand rail 19, supported from the radiator top 20 of automobile 5 by means of bracket 21, is stretched across the front of the vehicle near the upper front part thereof, thereby providing means which a person struck by the fender may grasp to save himself from serious injury.

The operation of my improved device is as follows:

In the normal position of the parts, hand lever 1 is pulled back to force lever 6 forward in supports 11, causing said lever to hold fender 12 in the position shown by the dotted lines in Fig. 1, in which position said fender acts as a bumper for protecting the radiator, lamps, tires, and the remainder, of the vehicle front. Should the driver be fearful of collision with a person, animal or movable object, which might be injured or which might injure the vehicle if struck, he pushes the hand lever 1 forward, whereby lever 6 is drawn backward through supports 11, fender 12 being thereby allowed to swing down about hinges 13, due to the weight of said fender.

In case a person should be struck, fender 12, being formed in the shape of a curve of gradually increasing radius as the upper part of the fender is approached, acts to deflect the body gradually upwardly along the curved fender, causing the body to move on to the cross part of frame 8, thence to the crank cover 16, all of which form substantially a continuous smooth surface from a point near the ground to the front part of the vehicle. The force of the blow is also partly spent in moving the person upwardly along the fender.

The person struck will be enabled to grasp hand rail 19 in such an emergency, thereby saving himself from further accident and the car is brought under control. Should the person struck not be able to grasp rail 19, he will nevertheless be saved from being run over by the wheels or other vehicle parts.

To raise fender 12 to its normal position in which it acts as a bumper, the upper end of hand lever 1 is pulled back whereby lever 6 is pushed forward, the end thereof engaging fender on its under side, swinging said fender about hinge 13. Further forward motion of lever 6 causes the end thereof to engage lug 15 to raise said lug, and the fender connected to it still higher, until the edge of said fender comes in contact with frame 8, in which position said fender is held up from underneath by means of said lever 6.

Two levers 6, supports 11 and lugs 15 are provided, one of each on each side of the vehicle for easy operation. Crank cover 16 may be readily gripped by slot 22 and raised about hinge rod 17 to allow for reaching the crank, should it become necessary to crank the engine. In the bumper position of fender 12, a head on collision would cause said fender to come into more or less violent contact with the tires of wheels 14 which absorb the blow in the same manner as a road shock on the tire would be absorbed.

What I claim is:—

1. In combination with a motor vehicle, a frame attached to the under side of said vehicle, a fender hingedly supported by said frame, and means slidably supported by said frame for partly rotating said fender about its hinged edge.

2. In combination with a motor vehicle, a frame attached to the under side of said vehicle, a fender hingedly supported by said frame, a hand rail attached to the front of said vehicle above said fender, and means manually operable from the inside of said vehicle for swinging said fender into operative position as a bumper and into operative position as a life saving device.

3. In combination with a motor vehicle, a swingable fender reaching across the front of said vehicle for acting as a bumper in its raised position and as a life saving device in its lowered position, a hand rail attached to the vehicle front above said fender, and manually operable means for swinging said fender comprising a hand lever positioned inside of said vehicle within reach of the driver thereof and a slidable lever operatively connecting said hand lever with said fender.

Signed at New York, in the county of New York and State of New York, this 22 day of December, A. D. 1919.

MARIA DOUJAK.